(12) United States Patent
Gosain (10) Patent No.: US 7,747,643 B2
(45) Date of Patent: Jun. 29, 2010

(54) INSTALLED BASE DATA HUB

(75) Inventor: Sunny Hemant Gosain, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 596 days.

(21) Appl. No.: 11/775,425

(22) Filed: Jul. 10, 2007

(65) Prior Publication Data

US 2009/0019434 A1 Jan. 15, 2009

(51) Int. Cl.
*G06F 17/30* (2006.01)
(52) U.S. Cl. ............... 707/781; 707/813; 707/E17.032
(58) Field of Classification Search ........... 707/781, 707/813, 999.102, 999.001, 999.206; 705/14.23, 705/14.51, 26, 336
See application file for complete search history.

(56) References Cited

U.S. PATENT DOCUMENTS

| | | | | |
|---|---|---|---|---|
| 6,014,641 A * | 1/2000 | Loeb et al. | ..................... | 705/34 |
| 7,343,006 B2 * | 3/2008 | Klearman et al. | ...... | 379/114.19 |
| 7,478,058 B2 * | 1/2009 | Byrne | ......................... | 705/26 |
| 2003/0097330 A1 * | 5/2003 | Hillmer et al. | ................ | 705/38 |
| 2007/0239858 A1 * | 10/2007 | Banerji et al. | ............... | 709/220 |

OTHER PUBLICATIONS

Oracle, Oracle Installed Base Concepts and Procedures, Release 11i, Apr. 2000.*

* cited by examiner

*Primary Examiner*—Cheryl Lewis
(74) *Attorney, Agent, or Firm*—Townsend and Townsend and Crew LLP (57) ABSTRACT

An installed base data hub for centrally managing information about the installed customer base of an enterprise is disclosed. According to one embodiment, an installed base data hub comprises a data repository configured to store installed base data, the installed base data including first information representative of at least one customer of the enterprise and second information representative of one or more products purchased by the customer. The hub further includes a data librarian configured to cleanse the installed base data, a security module configured to manage access to the data repository, a subscription interface configured to enable one or more of a plurality of spoke systems to read data from the repository, and a publication interface configured to enable one or more of the plurality of spoke systems to write data into the repository. In various embodiments, at least one of the spoke systems is external to the enterprise.

16 Claims, 5 Drawing Sheets

INSTALLED BASE DATA HUB

BACKGROUND OF THE INVENTION

Embodiments of the present invention generally relate to data management, and more particularly relate to an installed base data hub for centrally managing information about the installed customer base of a business or enterprise.

A data hub, or master data management ("MDM") solution, is a collection of software and/or hardware components that enables a business or enterprise (i.e., source enterprise) to maintain a single, "master" source of data that is accessible across multiple, heterogeneous information management systems. Currently, software vendors such as Oracle Corporation and IBM offer two types of data hubs: a "Customer" hub and a "Product" hub. These hubs provide a centralized view of a source enterprise's customer and product data respectively. However, the software industry has thus far failed to provide a solution for centrally managing the intersection of information between customers and products—in other words, the installed customer base.

The management of installed base data has become increasingly important in recent years as companies have moved to out-sourcing various customer-related business functions (e.g., product service, sales, etc.) to third-party partners. In many instances, these partners rely on installed base information to carry out their jobs. For example, a product manufacturer may employ a number of external contractors to provide warranty service for the different types and configurations of products that it sells. The contractors may, in turn, employ a number of subcontractors to provide service for specific subcomponents of a product. Each contractor or subcontractor in this multi-tiered network needs access to consistent and up-to-date installed base information (e.g., customer names, addresses, warranty terms, part/model/serial numbers of products sold/deployed/installed, etc.) to properly service the manufacturer's customers.

A manufacturer may also work with a number of reselling partners to sell its products through various retail channels. In this case, the reselling partners may wish to leverage installed base information to accurately identify the demographics of the manufacturer's installed customer base and target marketing and/or up-selling campaigns accordingly.

To address the foregoing needs, many external partners maintain a mirrored copy of a manufacturer's installed base data in their own information management systems. However, this approach is problematic for several reasons. First, it is inefficient because it doubles the amount of processing and memory resources required to maintain a single set of data (i.e., the installed base data). Second, it is cumbersome because it requires a partner to synchronize it's mirrored installed base data with the manufacturer's master data on a periodic basis. Even with frequent synchronizations, there may be situations where the partner's mirrored data is stale, possibly leading to processing errors and a degraded quality of service to customers.

Another solution is to create a proprietary, point-to-point interface between the information management systems of a partner and manufacturer. For instance, the partner and manufacturer may contract with a developer to develop a custom interface that will enable their systems to intercommunicate. Unfortunately, the creation of custom interfaces is generally a slow process as the developer must design and test the interface for the specific systems being connected. Such interfaces are also fragile, in that modifications to either system (e.g., updating versions of software) may break the communication path until such time as modifications to the interface are made. Further, a point-to-point interface is specific to the particular partner for which it is developed, and thus cannot be leveraged by all external partners interested in accessing and updating the manufacturer's installed base data.

BRIEF SUMMARY OF THE INVENTION

Embodiments of the present invention address the foregoing and other such problems by providing an installed base data hub that can interoperate with multiple, heterogeneous systems (i.e., "spoke systems") and thus serve as a centralized data source for all parties (i.e., "partners") interested in the installed customer base data of a source enterprise. In various embodiments, the spoke systems that interface with the hub may be operated by partners that are internal or external to the source enterprise.

As used herein, "installed base data" or "installed customer base data" refers to information about product (or service) units purchased by customers of a source enterprise. For example, installed base data may include (but is not limited to) customer code, customer location, product code/model/serial number, product attributes (e.g., size, color, etc.), warranty terms, and other such information.

In one set of embodiments, an installed base data hub includes a central data repository/dictionary, a data librarian, a security module, a set of programmatic subscription/publication interfaces, and an administrative module. The central data repository is configured to store installed base master data. The data librarian is a software and/or hardware module that is configured to "cleanse" data that is imported or published into the data repository. Data "cleansing" may include resolving data conflicts, removing duplicate data entries, and augmenting incoming data with new fields or categorizations. The security module is configured to define and enforce security rules (e.g., read-only, write, read and write, etc.) associated with spoke systems that interact with the hub. The programmatic subscription/publication interfaces provide a mechanism for spoke systems to read (i. e., subscribe) and write (i.e., publish) information to the central data repository. In one embodiment, the subscription/publication interfaces are implemented as Web Services. And the administrative module provides an interface for managing aspects of the data repository, data librarian, and security module.

In various embodiments, an installed base data hub may be deployed by first consolidating all installed base information for a source enterprise from various internal and/or external data systems (e.g., product manufacturing, accounting/billing, customer relationship management ("CRM"), etc.). This consolidation may be performed through a data loader program or manual entry. The incoming data may then be cleansed, either in a streaming or batch fashion, to remove redundant data, resolve data conflicts, and augment the data as described previously. Finally, security rules that manage access to the hub may be defined. In a typical deployment, one or more security rules are associated to a security role, and one or more roles are associated to a hub user, such as a spoke system.

By providing a centralized source of information regarding the installed customer base of a source enterprise, embodiments of the present invention significantly reduce the operational inefficiencies associated with maintaining mirrored sets of installed base data across the systems of external partners. Embodiments of the present invention also provide a single, consistent data source for intra-enterprise systems that may require access installed base data (e.g., marketing, product research, accounting/billing, etc.).

According to one embodiment of the present invention, an installed base data hub comprises a data repository configured to store installed base data for an enterprise, the installed base data including first information representative of at least one customer of the enterprise and second information representative of one or more products purchased by the at least one customer. The hub further includes a data librarian module configured to cleanse the installed base data, a security module configured to manage access to the data repository, a subscription interface configured to allow one or more of a plurality of spoke systems to read data from the data repository, and a publication interface configured to allow one or more of the plurality of spoke systems to write data into the data repository. In various embodiments, at least one of the plurality of spoke systems is external to the enterprise.

According to another embodiment of the present invention, a system for managing installed base data comprises a database configured to store installed base data for an enterprise, the installed base data including first information representing at least one customer of the enterprise and second information representing one or more products purchased by the at least one customer. The system further comprises at least one server in communication with the database, the server configured to cleanse the installed base data, manage access to the data repository, process requests to read data from the data repository, and process requests to write data to the data repository. In various embodiments, the requests to read and write data are received from one or more of a plurality of spoke systems, where at least one of the plurality of spoke systems is external to the enterprise According to yet another embodiment of the present invention, a computer program product embedded in a computer readable medium for executing an installed base data hub is disclosed. The computer program product includes program code for storing installed base data for an enterprise in a data repository, the installed base data including first information representing at least one customer of the enterprise and second information representing one or more products purchased by the at least one customer. The computer program product further includes program code for cleansing the installed base data, program code for managing access to the data repository, program code for processing requests to read data from the data repository, and program code for processing requests to write data to the data repository. In various embodiments, the requests to read and write data are received from one or more of a plurality of spoke systems, where at least one of the plurality of spoke systems is external to the enterprise.

According to another aspect of the present invention, a computer-implemented method for deploying an installed base data hub comprises receiving installed base data from a plurality of disparate data sources, the installed base data including first information representative of at least one customer of the enterprise and second information representative of one or more products purchased by the at least one customer. The method further comprises cleansing the received installed base data, the cleansing comprising removing duplicates and standardizing the format of the installed base data, storing the installed base data in a data repository, and defining security rules identifying one or more spoke systems that can read data from the data repository and one or more spoke systems that can write data to the data repository.

A further understanding of the nature and the advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention provide an installed base data hub that enables multiple, heterogeneous spoke systems to access a centralized data source describing the installed customer base of a source enterprise. Specific embodiments may be particularly useful for product and service providers who must share installed base information with a number of external business partners, each running disparate information management systems. Current methods of information sharing via data replication or proprietary interfaces are problematic because they can be cumbersome, inefficient, and costly. Embodiments of the present invention overcome these problems and thus facilitate the sharing of installed base data across the disparate systems of multiple businesses/enterprises.

Figure 1:
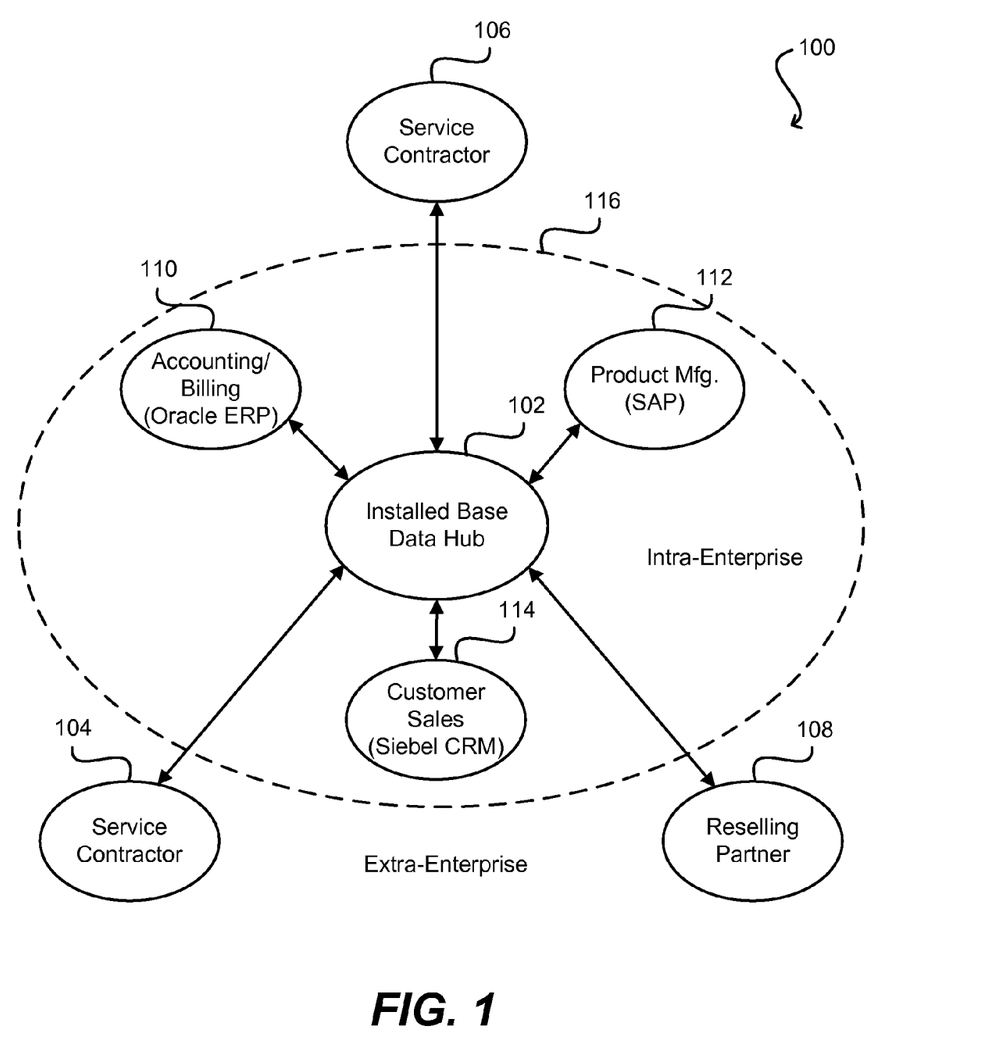
FIG. 1 illustrates an exemplary operating environment for an installed base data hub in accordance with one embodiment of the present invention.

FIG. 1 illustrates an exemplary operating environment for an installed base data hub in accordance with an embodiment of the present invention. As shown, environment 100 includes an installed base data hub 102 communicatively coupled to spoke systems 104, 106, 108, 110, 112, 114 (extra-enterprise systems 104, 106, 108 and intra-enterprise systems 110, 112, 114). Installed base data hub 102 is operated by a source enterprise 116. As discussed above, installed base data hub 102 acts as a centralized source of information regarding the installed customer base of enterprise 116.

In one set of embodiments, extra-enterprise systems 104, 106, 108 are operated by one or more external partners of source enterprise 116 that are interested in installed base information. These include, for example, service contractors, reselling partners, and the like. Intra-enterprise systems 110, 112, 114 are run by various internal business units or groups of source enterprise 116 that may need to populate data into, or read data from, installed base data hub 102. For instance, hub 102 may receive data regarding customer purchases from accounting system 110 and customer sales system 114. Similarly, hub 102 may receive data regarding the specifications of a purchased product (e.g., color, size, serial number, manufacture date, etc.) from product manufacturing system 112. Although only six spoke systems are shown as interacting with installed base data hub 102, one of ordinary skill in the art would appreciate that any number of spoke systems may be supported.

In various embodiments, spoke systems 104, 106, 108, 110, 112, 114 may run any one of a number of different (i.e., heterogeneous) application platforms. For example, as illustrated, accounting/billing system 110 may run an Oracle ERP application, product manufacturing system 112 may run an SAP application, and customer sales system 114 may run a Siebel CRM application. Similarly, systems 104, 106, 108 may each run any of the above mentioned platforms or any other application platform. Installed base data hub 102 is configured to interoperate with each of these disparate systems/platforms.

Figure 2:
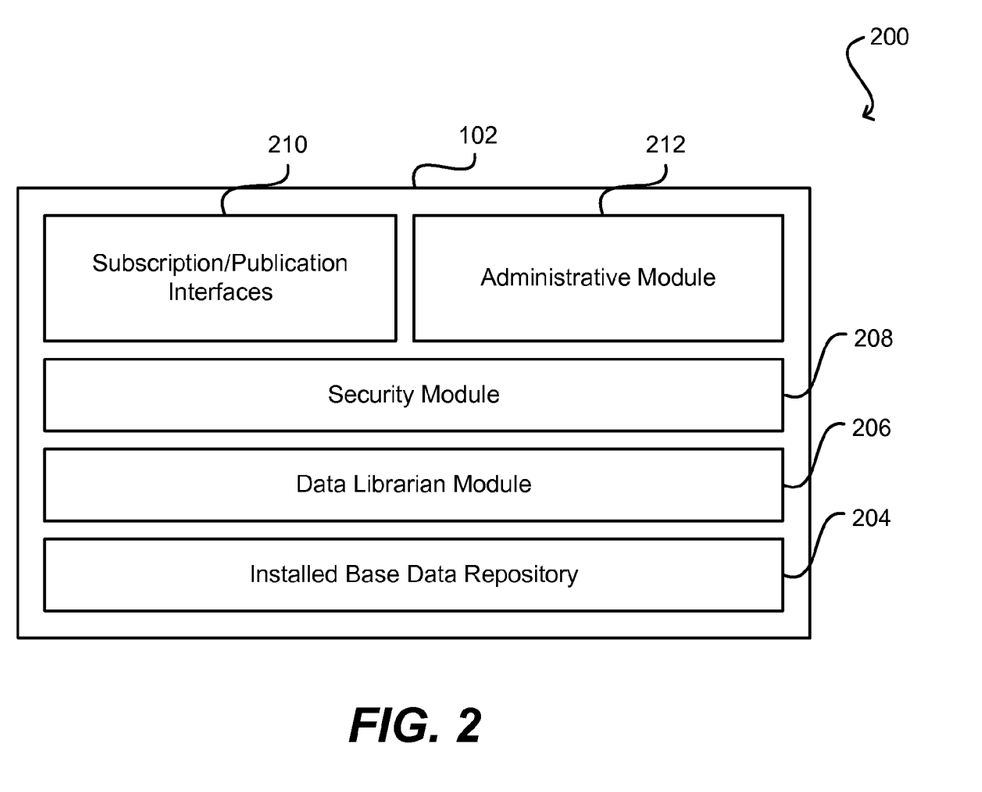
FIG. 2 illustrates a simplified block diagram of an installed base data hub in accordance with one embodiment of the present invention.

FIG. 2 is a simplified block diagram of installed base data hub 102 in accordance with one embodiment of the present invention. Installed base data hub 102 includes installed base repository 204, data librarian module 206, security module 208, subscription/publication interfaces 210, and administrative module 212.

Installed base repository 204 is configured to store the installed customer base data of source enterprise 116. As used herein, "installed customer base data" or "installed base data" represents information about product or service units purchased by customers of source enterprise 116. Installed base data may include (but is not limited to) installed base ID, customer code, customer name, customer location, product code, product name, product model number, product serial number, product physical attributes (e.g., color, size, shape, etc.), product quantity, warranty terms, replacement part serial number, and the like.

In an exemplary embodiment, installed base repository 204 is implemented as a relational database or a collection of relational databases. In alternative embodiments, repository 204 may be implemented using any other logical storage format (e.g., flat file, etc.). Although installed base repository 204 is shown in FIG. 2 as an integral part of hub 102, repository 204 may reside on storage that is local or remote to the other components of hub 102.

Data librarian module 206 consists of one or more software and/or hardware components that are configured to "cleanse" the installed base data stored in installed base repository 204. Data "cleansing," or reconciliation, is designed to improve the quality and integrity of installed base data since such data is typically imported/updated from a number of different systems. One type of data cleansing that may be performed by data librarian 206 is the resolution of data conflicts. A data conflict occurs when hub 102 receives conflicting information from two or more spoke systems. For example, accounting/billing spoke system 110 may publish data to hub 102 regarding customer number 1000 that includes a customer name value of "Lee Smith." Service contractor spoke system 104 may also publish data to hub 102 regarding customer number 1000, but with a customer name value of "L. Smith." In these cases, data librarian 206 may resolve the data conflict using one or more predefined business rules. For example, one business rule may give priority to a data value received from an intra-enterprise system over a conflicting value received from an extra-enterprise system. As described in further detail below, conflict resolution business rules may be defined by a user with appropriate privileges via administrative module 212.

A second type of data cleansing that may be performed by data librarian 206 is the elimination of duplicate data entries. Duplicate entries typically appear when data is merged or assimilated into installed base repository 204 from a number of different systems for the first time. For example, accounting/billing spoke system 110 and customer sales spoke system 114 may each contain a data record for customer number 1000. When the data from these two systems are merged into hub 102, the data needs to be filtered for duplicate information so that only a single record for customer number 1000 is stored in installed base repository 204.

A third type of data cleansing that may be performed by data librarian 206 is the augmentation of data received from spoke systems. In various embodiments, augmentation includes adding additional qualifiers or categorizations to the data that were not present in the original system, merging existing categories and values, and the like. This allows incoming data to be formatted and stored in a standardized form in installed base repository 204.

Data librarian 206 may be implemented as any type of software/hardware component or combination of software/hardware components. For example, data librarian 206 may be implemented as one or more PL/SQL packages resident in installed base repository 204. Alternatively, data librarian 206 may be implemented as one or more Java programs resident in an application server. In one embodiment, data librarian 206 operates in real-time and cleanses data as it is imported/published into installed base data hub 102. In other embodiments, data librarian operates as a batch process and processes installed base data stored in repository 204 at predefined intervals. One of ordinary skill in the art would recognize many variations, modifications, and alternatives.

Security module 208 comprises one or more rules defining the security privileges of end-users (e.g., spoke systems) and administrators of installed base data hub 102. Exemplary rules include read-only access to installed base repository 204, read-write access, and the like. In an exemplary embodiment, one or more rules are associated with a security role, and one or more roles are associated with a hub user. For instance, a spoke system (e.g., hub user) may be assigned an "end-user" role consisting of read-write access to repository 204. A system administrator may be assigned a "super user" role consisting of additional privileges such as the ability to modify the configuration of security module 208 and data librarian 206.

In various embodiments, security module 208 also includes one or more software and/or hardware components for managing access (e.g., authenticating and authorizing users) to hub 102 according to the security rules defined. Security module 208 may implement any one of a number of known authentication/authorization mechanisms, such as username/password, cryptographic keys, and the like. One of ordinary skill in the art would recognize many variations, modifications, and alternatives.

According to one set of embodiments, a role may comprise additional options defining the operation of hub 102. For example, an "end-user" role associated with spoke systems may include a "notification" option that controls how a spoke system is notified when data is updated in installed base repository 204. In one embodiment, a spoke system may be notified by e-mail when an update occurs. Alternatively, an "update" flag may be set in installed base repository 204 indicating that a change has been made.

Subscription and publication interfaces 210 enable spoke systems such as 104, 106, 108, 110, 112, 114 to read and write data to installed base repository 204 respectively. In an exemplary embodiment, interfaces 210 are implemented as Application Programming Interfaces ("APIs") using a standardized invocation format and parameter model, thereby allowing any heterogeneous system following the standardized format and model to access hub 102. In one set of embodiments, subscription/publication interfaces 210 are implemented as Web Services. Interface 210 may also be implemented using any other standardized remote invocation interface such as CORBA, Java Remote Method Invocation ("RMI"), and the like. One of ordinary skill in the art would recognize many variations, modifications, and alternatives.

Administrative module 212 consists of a user interface for managing aspects of hub 102 including installed base repository 204, data librarian module 206, and security module 208. With respect to installed base repository 204, administrative module 212 may include functions for manually modifying the installed base data in the repository and changing the data model. With respect to data librarian 206, administrative module 212 may include functions for defining business rules/logic for resolving data conflicts, data merging, and data augmentation. With respect to security module 208, administrative module 212 may include functions for creating security rules, roles, and users, and defining the associations between each.

According to one set of embodiments, the user interface of administrative module 212 is implemented as a Web-based form. In other embodiments, the user interface may be implemented as any other type of software-based interface such as a proprietary application window, etc.

Figure 3:
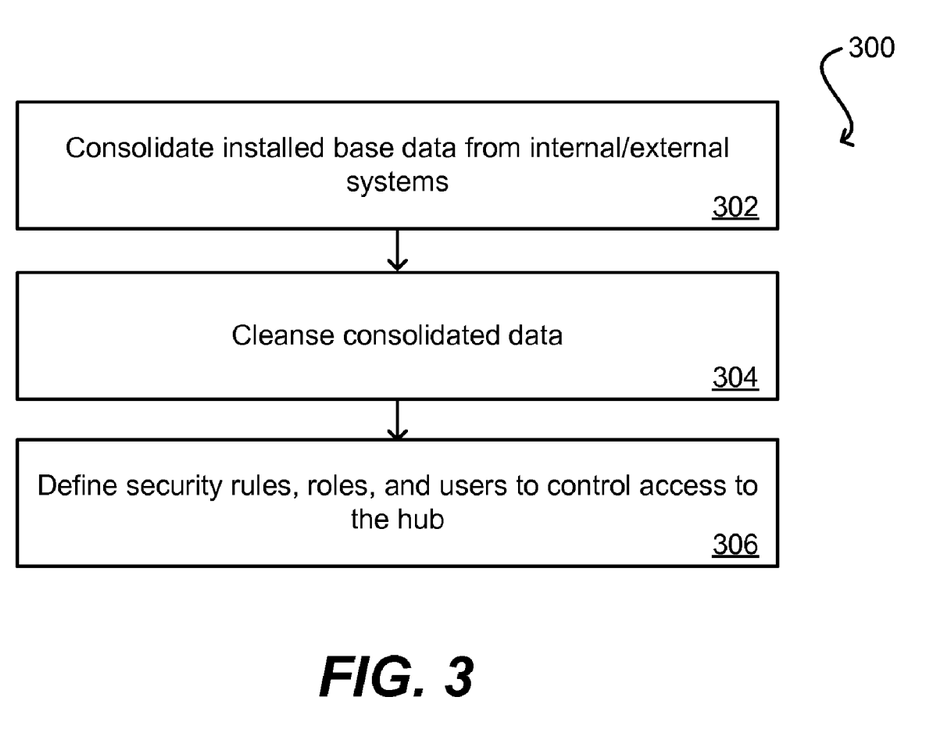
FIG. 3 illustrates the steps performed in deploying an installed base data hub in accordance with one embodiment of the present invention.

FIG. 3 illustrates the steps performed in deploying an installed base data hub in accordance with one embodiment of the present invention. At step 302, installed base data from various internal and external systems is consolidated. This step includes identifying the systems that contain relevant installed base data and importing/merging the data from those systems into installed base repository 204. Importation can be performed using a streaming loader program (e.g., XML-based loader), a batch-based program, or through manual entry of data.

Once data has been consolidated in installed base repository 204, the data is cleansed using data librarian module 206 (step 304). As described above, data cleansing includes resolving data conflicts, removing duplicates, and augmenting the data to conform to a consistent format. At step 306, security rules, roles, and users are defined.

In various embodiments, method 300 may be performed in an automated or semi-automated fashion. For example, a deployment process or script may automatically consolidate data from a predefined list of source systems, cleanse the consolidated data, and setup a default set of security rules, roles, and users. In other embodiments, each step (302, 304, 306) may be executed or initiated manually by a hub administrator.

It should be appreciated that the specific steps illustrated in FIG. 3 provide a particular method of deploying an installed base data hub according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Although portions of the foregoing have been discussed with respect to the product manufacturing context, embodiments of the present invention are widely applicable to other industries/enterprises such as utilities, telecommunications, high-tech original equipment manufacturers ("OEMs"), and other service/product providers.

Figure 4:
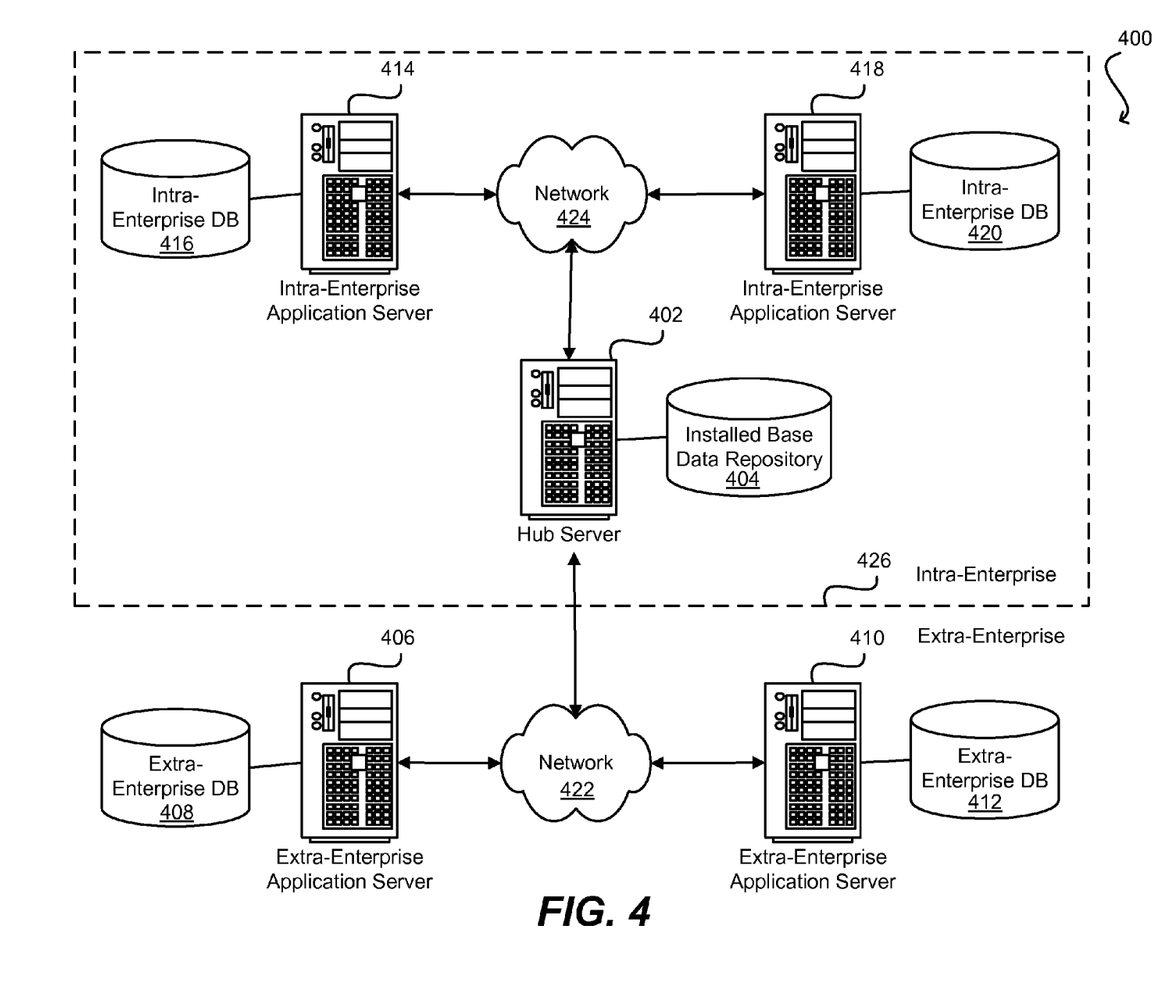
FIG. 4 illustrates components of an exemplary system environment that can be used in accordance with one embodiment of the present invention.

FIG. 4 is a block diagram illustrating components of an exemplary system environment in which various embodiments of the present invention may be implemented. System 400 includes one or more hub servers 402, one or more extra-enterprise application servers 406, 410, and one or more intra-enterprise application servers 414, 418. In various embodiments, hub server 402 is configured to operate portions of an installed base data hub as described herein, such as the data librarian module, the security module, the subscription/publication interfaces, and the administrative module. Although only one hub server is shown, one of ordinary skill in the art will appreciate that any number of hub servers may be supported. Extra-enterprise servers 406, 410 are configured to operate the information management systems of external partners such as service contractors and resellers. Intra-enterprise servers 414, 418 are configured to operate various internal IT systems such as accounting/billing, product manufacturing, CRM, and the like. As shown in FIG. 4, hub server 402 and intra-enterprise servers 414, 418 are "internal" to source enterprise 426 (i.e., they reside inside the enterprise network boundary), whereas extra-enterprise servers 406, 410 are "external" to source enterprise 426 (i.e., they reside outside the enterprise network boundary). In alternative embodiments, server computers 402, 406, 410, 414, 418 may all be resident on the same network.

Server computers 402, 406, 410, 414, 418 may be general purpose computers, specialized server computers (including, merely by way of example, PC servers, UNIX servers, mid-range servers, mainframe computers rack-mounted servers, etc.), server farms, server clusters, or any other appropriate arrangement and/or combination. Each server 402, 406, 410, 414, 418 may run an operating system including various versions of Microsoft Windows and/or Apple Macintosh operating systems, UNIX or UNIX-like operating systems (including without limitation, the variety of GNU/Linux operating systems), as well as any other commercially-available server operating systems. Servers 402, 406, 410, 414, 418 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

As shown, extra-enterprise servers 406, 410 and hub server 402 communicate via network 422. Similarly, intra-enterprise servers 414, 418 and hub server 402 communicate via network 424. Networks 422, 424 may represent any type of network familiar to those skilled in the art that can support data communications using any of a variety of commercially-available protocols, including without limitation TCP/IP, SNA, IPX, AppleTalk, and the like. Merely by way of example, networks 422, 424 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

System environment 400 may also include one or more databases 404, 408, 412, 416, 420. For instance, database 404 represents a central data repository for installed base data hub 402 as described in the foregoing disclosure. Databases 404, 408, 412, 416, 420 may reside in a variety of locations. By way of example, databases 404, 408, 412, 416, 420 may reside on a storage medium local to (and/or resident in) one or more of the server computers 402, 406, 410, 414, 418. Alternatively, they may be remote from any or all of the server computers 402, 406, 410, 414, 418, and/or in communication (e.g., via network 422 or 424) with one or more of these. In a particular set of embodiments, databases 404, 408, 412, 416, 420 may reside in one or more storage-area networks ("SAN") familiar to those skilled in the art. Similarly, any necessary files for performing the functions attributed to the server computers 402, 406, 410, 414, 418 may be stored locally on the respective computer and/or remotely, as appropriate. In one set of embodiments, databases 404, 408, 412, 416, 420 may be relational databases, such as Oracle 10g, that are adapted to store, update, and retrieve data in response to SQL-formatted commands.

Figure 5:
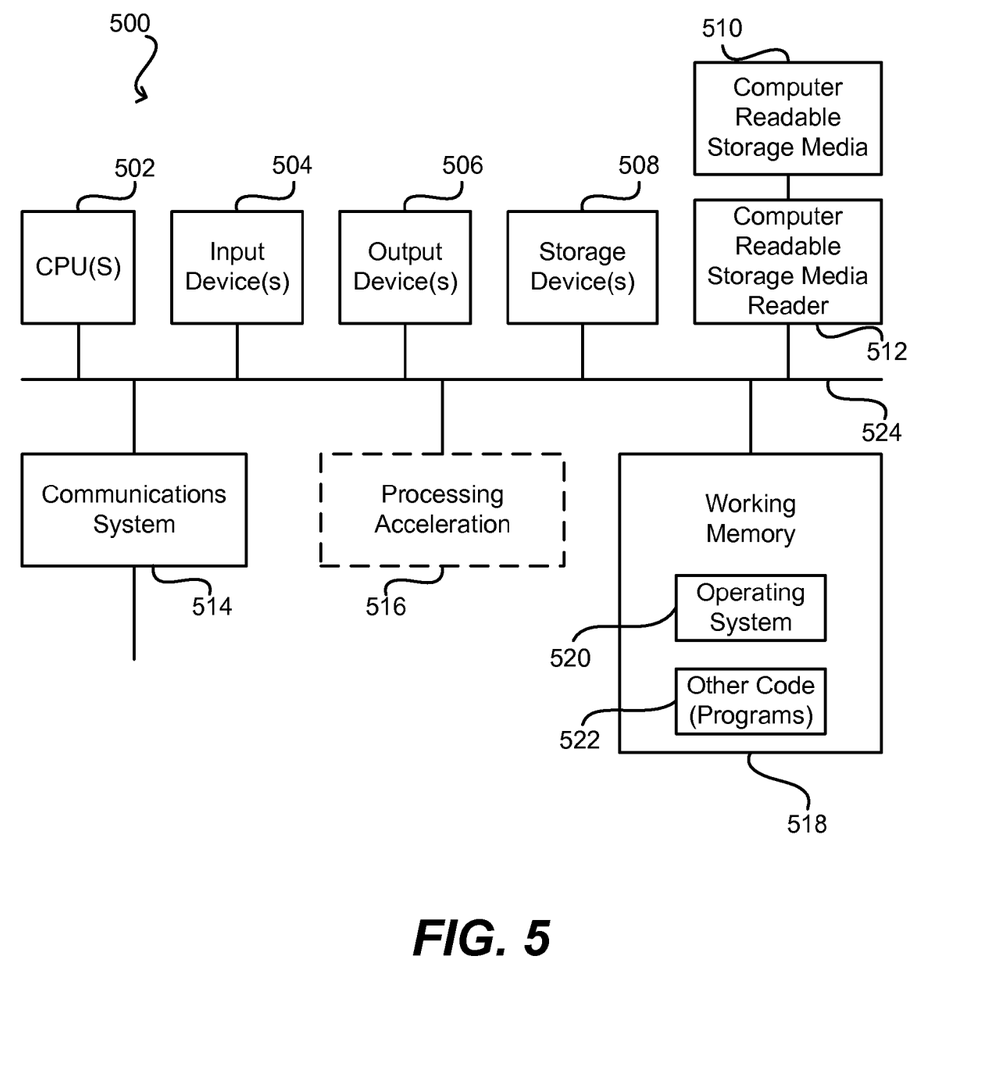
FIG. 5 illustrates components of a computerized device that can be used in accordance with one embodiment of the present invention.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 may include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. The communications system 514 may permit data to be exchanged with the network and/or any other computer described above with respect to the system environment 400.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternative embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An installed base data hub comprising:
a data repository configured to store installed base data for an enterprise, the installed base data including first information representative of at least one customer of the enterprise and second information representative of one or more products purchased by the at least one customer;
a data librarian module configured to cleanse the installed base data, wherein the cleansing comprises:
receiving a first piece of installed base data from a first spoke system in a plurality of spoke systems,
receiving a second piece of installed base data from a second spoke system in the plurality of spoke systems;
determining a conflict between the first piece of installed base data and the second piece of installed base data; and
determining a resolution to the conflict based upon one or more predefined rules;
a security module configured to manage access to the data repository;
a subscription interface configured to enable one or more of the plurality of spoke systems to read data from the data repository; and
a publication interface configured to enable one or more of the plurality of spoke systems to write data into the data repository,
wherein at least one of the plurality of spoke systems is external to the enterprise.

2. The installed base data hub of claim 1, wherein the first spoke system runs a first application platform and second spoke system runs a second application application platform that is different from the first application platform.

3. The installed base data hub of claim 1, wherein the at least one spoke system is operated by a business partner of the enterprise.

4. The installed base data hub of claim 1, wherein the installed base data further includes a location of the at least one customer and one or more physical attributes of the one or more products purchased by the at least one customer.

5. The installed base data hub of claim 1, where the subscription interface and the publication interface are implemented as Web Services.

6. The installed base data hub of claim 1, wherein cleansing the installed base data further comprises:
   identifying duplicate data records in the installed base data; and
   removing the duplicate data records.

7. The installed base data hub of claim 1, wherein the one or more predefined rules are defined by an administrator of the hub.

8. The installed base data hub of claim 1, wherein cleansing the installed base data is performed as a batch process.

9. The installed base data hub of claim 1. wherein cleansing the installed base data is performed in real-time.

10. The installed base data hub of claim 1, wherein the data librarian module is further configured to merge installed base data received from two or more spoke systems in the plurality of spoke systems.

11. The installed base data hub of claim 1, wherein the security module comprises a plurality of rules, one or more rules in the plurality of rules being associated with a user role, one or more user roles being associated to a user of the hub.

12. The installed base data hub of claim 1, wherein at least one spoke system in the plurality of spoke systems is notified when the installed base data in the data repository is updated.

13. The installed base data hub of claim 1 further comprising an administrative module configured to allow management of the data repository, the data librarian module, and the security module.

14. A method comprising:
   receiving, by the computer system, installed base data from a plurality of disparate data sources, the installed base data including first information representative of at least one customer of the enterprise and second information representative of one or more products purchased by the at least one customer;
   cleansing, by the computer system, the received installed base data, the cleansing comprising:
      receiving a first piece of installed base data from a first spoke system in a plurality of spoke systems,
      receiving a second piece of installed base data from a second spoke system in the plurality of spoke systems;
      determining a conflict between the first piece of installed base data and the second piece of installed base data; and
      determining a resolution to the conflict based upon one or more predefined rules;
   storing, by the computer system, the installed base data in a data repository;
   and defining, by the computer system, security rules identifying one or more spoke systems in the plurality of spoke systems that can read data from the data repository and one or more spoke systems in the plurality of spoke systems that can write data to the data repository.

15. A system for managing installed base data, the system comprising:
   a database configured to store installed base data for an enterprise, the installed base data including first information representing at least one customer of the enterprise and second information representing one or more products purchased by the at least one customer; and
   at least one server in communication with the database, the server configured to:
      cleanse the installed base data, the cleansing comprising:
         receiving a first piece of installed base data from a first spoke system in a plurality of spoke systems,
         receiving a second piece of installed base data from a second spoke system in the plurality of spoke systems;
         determining a conflict between the first piece of installed base data and the second piece of installed base data; and
         determining a resolution to the conflict based upon one or more predefined rules;
      manage access to the data repository;
      process requests to read data from the data repository, and
      Process requests to write data to the data repository,
   wherein the requests to read and write data are received from one or more of the plurality of spoke systems, and wherein at least one of the plurality of spoke systems is external to the enterprise.

16. A computer readable storage medium having stored thereon program code executable by a computer system, the program code comprising:
   program code for storing installed base data for an enterprise in a data repository, the installed base data including first information representing at lest one customer of the enterprise and second information representing one or more products purchased by the at least one customer;
   program code for cleansing the installed base data, the cleansing comprising:
      receiving a first piece of installed base data from a first spoke system in a plurality of spoke systems,
      receiving a second piece of installed base data from a second spoke system in the plurality of spoke systems;
      determining a conflict between the first piece of installed base data and the second piece of installed base data; and
      determining a resolution to the conflict based upon one or more predefined rules;
   program code for managing access to the data repository;
   program code for processing requests to read data from the data repository; and
   program code for processing requests to write data to the data repository;
   wherein the requests to read and write data are received from one or more of the plurality of spoke systems, and wherein at least one of the plurality of spoke systems is external to the enterprise.

* * * * *

UNITED STATES PATENT AND TRADEMARK OFFICE
CERTIFICATE OF CORRECTION

| | | |
|---|---|---|
| PATENT NO. | : 7,747,643 B2 | Page 1 of 1 |
| APPLICATION NO. | : 11/775425 | |
| DATED | : June 29, 2010 | |
| INVENTOR(S) | : Sunny Hemant Gosain | |

It is certified that error appears in the above-identified patent and that said Letters Patent is hereby corrected as shown below:

In column 2, line 39, delete "(i. e.," and insert -- (i.e., --, therefor.

In column 3, line 33, delete "enterprise" and insert -- enterprise. --, therefor.

In column 10, line 63, in claim 2, before "platform" delete "application".

In column 11, line 18, in claim 9, delete "claim 1." and insert -- claim 1, --, therefor.

In column 12, line 25, in claim 15, delete "Process" and insert -- process --, therefor.

In column 12, line 35, in claim 16, delete "at lest" and insert -- at least --, therefor.

Signed and Sealed this
Twenty-third Day of August, 2011

David J. Kappos
*Director of the United States Patent and Trademark Office*